(12) United States Patent
Fan et al.

(10) Patent No.: US 10,031,687 B2
(45) Date of Patent: Jul. 24, 2018

(54) COMPUTER STORAGE ALLOCATION ON PRIORITIZED STORAGE TIERS

(71) Applicant: International Business Machines Corporation, Armonk, NY (US)

(72) Inventors: Shan Fan, Shanghai (CN); Yang Liu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 15/143,652

(22) Filed: May 2, 2016

(65) Prior Publication Data
US 2017/0315746 A1    Nov. 2, 2017

(51) Int. Cl.
*G06F 3/06* (2006.01)
*G06F 12/02* (2006.01)

(52) U.S. Cl.
CPC .......... *G06F 3/0631* (2013.01); *G06F 3/061* (2013.01); *G06F 3/0604* (2013.01); *G06F 3/0649* (2013.01); *G06F 3/0673* (2013.01); *G06F 12/0284* (2013.01); *G06F 2212/7202* (2013.01)

(58) Field of Classification Search
None
See application file for complete search history.

(56) References Cited

U.S. PATENT DOCUMENTS

| | | | |
|---|---|---|---|
| 6,324,620 B1 * | 11/2001 | Christenson | G06F 3/061 710/74 |
| 8,006,111 B1 * | 8/2011 | Faibish | G06F 1/3221 711/114 |
| 8,880,835 B2 | 11/2014 | Benhase et al. | |
| 8,976,636 B1 | 3/2015 | Martin et al. | |
| 2011/0010514 A1 * | 1/2011 | Benhase | G06F 3/061 711/162 |
| 2011/0179219 A1 * | 7/2011 | Ma | G06F 3/0613 711/103 |
| 2012/0173831 A1 * | 7/2012 | Rubio | G06F 3/0605 711/165 |
| 2012/0246386 A1 * | 9/2012 | Akutsu | G06F 3/061 711/103 |
| 2013/0290598 A1 * | 10/2013 | Fiske | G06F 3/0625 711/103 |
| 2015/0066998 A1 * | 3/2015 | Beck | G06F 17/30312 707/812 |

* cited by examiner

*Primary Examiner* — Kaushikkumar Patel
(74) *Attorney, Agent, or Firm* — Edward J. Wixted, III

(57) ABSTRACT

A computer-implemented method includes identifying a prioritized storage tier; identifying one or more newly allocated data artifacts each associated with a newly allocated data access density value; and identifying one or more optimized data artifacts each associated with an optimized data access density value. The computer-implemented method further includes determining a threshold access density value based on each newly allocated data access density value and determining a prioritized tier organization scheme associated with the prioritized storage tier based on the threshold access density value. A corresponding computer program product and computer system are also disclosed.

5 Claims, 5 Drawing Sheets

COMPUTER STORAGE ALLOCATION ON PRIORITIZED STORAGE TIERS

BACKGROUND

The present invention relates generally to the field of computer storage systems, and more particularly to allocating storage resources on prioritized storage tiers in those systems.

In computer storage systems that have a prioritized storage tier, allocating the space on that storage tier in a manner that improves the performance and reliability of the computer storage system is important. An efficient technique for storing data artefacts on a prioritized storage tier can have a positive impact on the overall performance and reliability of the computer storage system. Developers and users of computer storage systems continue to have difficulty with the performance and reliability of such systems.

SUMMARY

A computer-implemented method includes identifying a prioritized storage tier; identifying one or more newly allocated data artefacts each associated with a newly allocated data access density value; and identifying one or more optimized data artefacts each associated with an optimized data access density value. The computer-implemented method further includes determining a threshold access density value based on each newly allocated data access density value and determining a prioritized tier organization scheme associated with the prioritized storage tier based on the threshold access density value. A corresponding computer program product and computer system are also disclosed.

DETAILED DESCRIPTION

Figure 1:
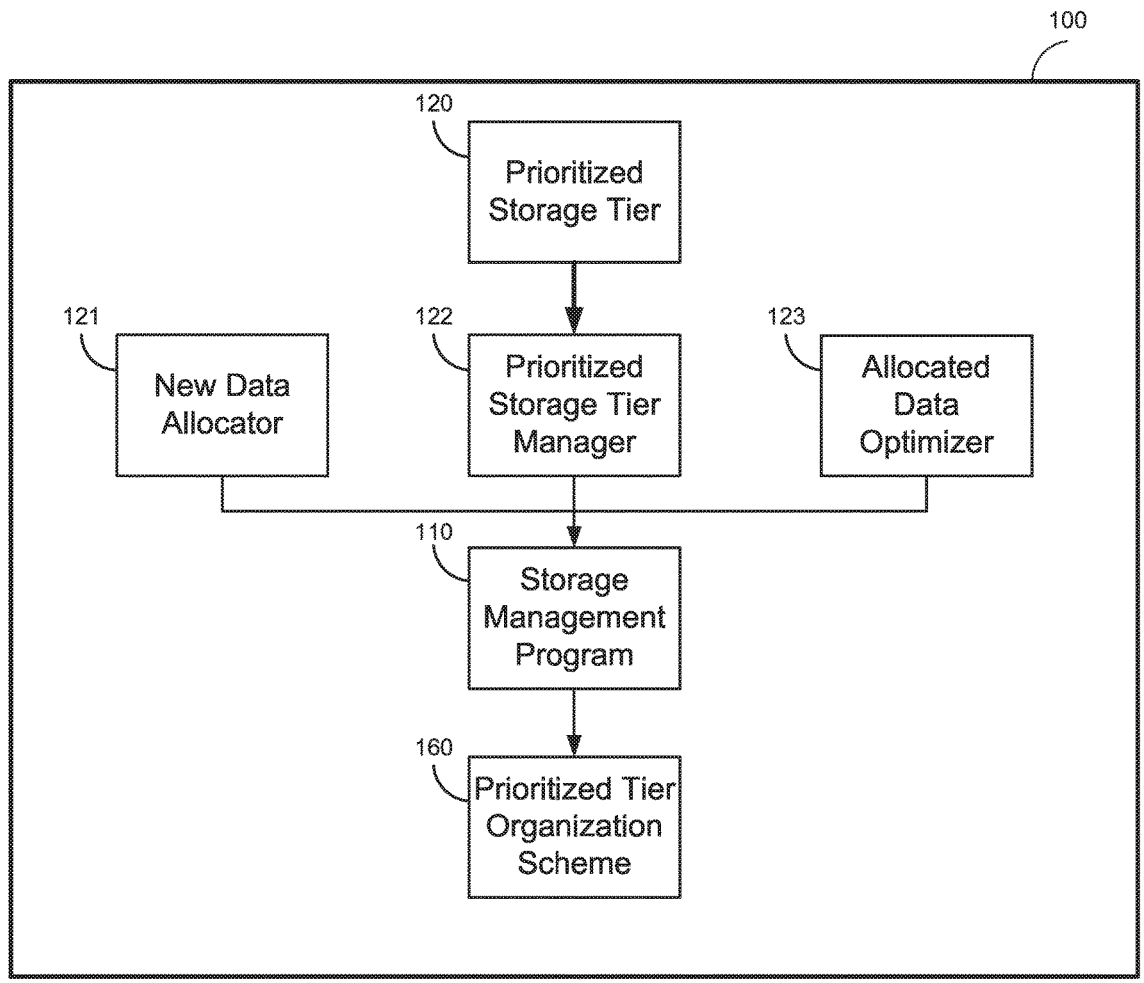
FIG. 1 is a block diagram of one embodiment of a computer system environment suitable for operation of a storage management program, in accordance with at least one embodiment of the present invention.

FIG. 1 is a block diagram of a computer system environment 100 suitable for operating a storage management program 110, in accordance with at least one embodiment of the present invention. In the computer system environment 100 depicted in FIG. 1, a new data allocator 121 is any combination of one or more computer (hardware or software) components that, during regular, non-exceptional executions, allocates at least one new data artefact on at least one computer readable storage media unit, such as at least one memory unit and/or at least one persistent storage unit. In at least some embodiments, a data artefact is considered "new" with respect to a computer readable storage media unit if the data artefact has not previously been stored and/or allocated on the computer readable storage media unit.

In the computer system environment 100 depicted in FIG. 1, a prioritized storage tier manager 122 is any combination of one or more computer (hardware or software) components that, during regular, non-exceptional executions, manages and/or coordinates the storage of at least one data artefact on a prioritized storage tier 120. In at least some embodiments, a prioritized storage tier 120 is any collection of one or more computer readable storage media that is designated as a preferred location for storage of one or more data artefacts. In at least some embodiments, the prioritized storage tier 120 is reserved for one or more data artefacts designated as at least one of mission-critical, recently accessed, and/or top secret. In at least some embodiments, the prioritized storage tier 120 is the top storage tier in an information lifecycle management (ILM) framework. In some embodiments, a storage tier is a collection of one or more computer readable storage media (e.g., a collection of one or more computer readable storage media of the same type, which are designated to store one or more data artefacts of the same type). In some embodiments, the storage tier further comprises one or more communication links between the one or more computer readable storage media.

In the computer system environment 100 depicted in FIG. 1, an allocated data optimizer 123 is any combination of one or more computer (hardware or software) components that, during regular, non-exceptional executions, determines whether to move at least one previously allocated data artefact to a different storage tier from the storage tier in which it is allocated at the time the determination is made (e.g., to move at least one previously allocated data artefact to a higher storage tier). In some embodiments, a data artefact is considered "previously allocated" with respect to a computer readable storage media unit if the data artefact has previously been stored and/or allocated on the computer readable storage media unit at a predefined point in time (e.g., at the time the determination of whether a data artefact is a previously allocated data artefact is made and/or at the beginning of a predefined time period such as a decision window, as defined below).

In the computer system environment 100 depicted in FIG. 1, the storage management program 110 uses the information provided by the new data allocator 121, the prioritized storage tier manager 122, and the allocated data optimizer 123 to determine a prioritized tier organization scheme 160. In at least some embodiments, a prioritized tier organization scheme is any collection of one or more determinations about how at least part of the storage space of the prioritized storage tier 120 should be allocated between one or more data artefacts of one or more types and/or categories (e.g., between one or more new and one or more previously allocated data artefact).

Figure 2:
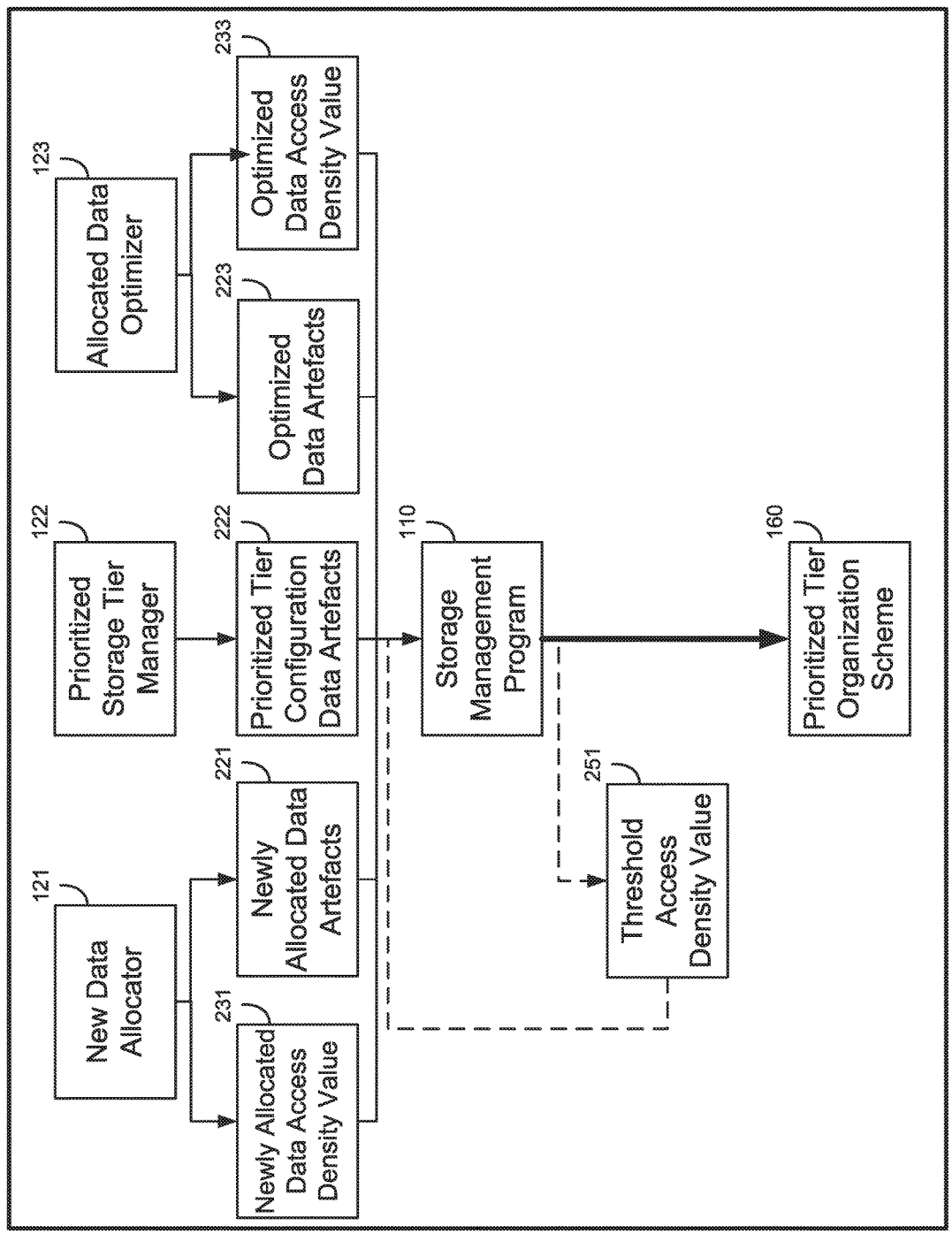
FIG. 2 is a flowchart diagram of a storage management program, in accordance with at least one embodiment of the present invention.

FIG. 2 is a data flow diagram of a storage management program 110, in accordance with at least some embodiments of the present invention. In the embodiment depicted in FIG. 2, the program 110 receives, from the new data allocator 121, one or more newly allocated data artefacts 221. In some embodiments, a newly allocated data artefact 221 is any data artefact that is allocated and/or stored within a predefined time period (i.e., a learning period) and/or any data artefact that has not been allocated and/or stored at the beginning of the predefined time period. In at least some embodiments, each newly allocated data artefact 221 is associated with a newly allocated data access density value 231 which is also received from the new data allocator 121. In at least some embodiments, a newly allocated data access density value 231 associated with the newly allocated data artefact 221 is any combination of one or more data artefacts that, in whole or in part, indicate at least one piece of information about at least one property (e.g., frequency, speed, level of user need, etc.) associated with the access (i.e., update or retrieval) of at least part of the newly allocated data artefact 221 by at least one user within at least one predefined time period (e.g., a learning period). In some embodiments, the newly allocated data access density value 231 associated with a newly allocated data artefact 221 is any combination of one or more data artefacts that, in whole or in part, indicate at least one piece of information about how often the newly allocated data artefact 221 is accessed by at least one user within at least one predefined time period (e.g., a learning period).

In the embodiment depicted in FIG. 2, the storage management program 110 receives one or more prioritized tier configuration data artefacts 222 from the prioritized storage tier manager 122. In at least some embodiments, a prioritized tier configuration data artefact 222 is any data artefact that, in whole or in part, indicate at least one piece of information about one property (e.g., available space, total space, speed of allocation, deallocation, and/or retrieval of data, etc.) associated with the prioritized storage tier at least one predefined point in time (e.g., at the beginning of a time period such as a learning period and/or a decision window) and/or within at least one predefined time period (e.g., a learning period and/or a decision window). In some embodiments, a prioritized tier configuration data artefact 222 is any data artefact that, in whole or in part, indicate at least one piece of information about the available space on the prioritized storage tier at the time the determination of the prioritized tier configuration data artefact 222 is made.

In the embodiment depicted in FIG. 2, the storage management program 110 receives, from the allocated data optimizer 123, one or more optimized data artefacts 223. In some embodiments, an optimized data artefact 223 is any data artefact previously allocated on the prioritized storage tier within a predefined time period (i.e., a decision window) and/or any data artefact that is stored on the prioritized storage tier at a predefined point in time (e.g., at the beginning of the decision window). In some embodiments, an optimized data artefact 223 is any data artefact that has been designated for promotion and/or has been promoted to a higher storage tier within a predefined time period (i.e., the decision window) and/or any data artefact that has been allocated and/or stored on the prioritized storage tier at the beginning of the predefined time period. In at least some embodiments, each optimized data artefact 223 is associated with an optimized data access density value 233 which is also received from the allocated data optimizer 123. In at least some embodiments, an optimized data access density value 233 associated with the optimized data artefact 223 is any combination of one or more data artefacts that, in whole or in part, indicate at least one piece of information about at least one property (e.g., frequency, speed, level of user need, etc.) associated with the access (i.e., update or retrieval) of at least part of the optimized data artefact 223 by at least one user within at least one predefined time period (e.g., a decision window). In some embodiments, the optimized data access density value 233 associated with the optimized data artefact 223 is any combination of one or more data artefacts that, in whole or in part, indicate at least one piece of information about how often the optimized data artefact 223 is accessed by at least one user within at least one predefined time period (e.g., a decision window).

In the embodiment depicted in FIG. 2, the storage management program 110 uses the newly allocated data access density values to determine a threshold access density value 251. In at least some embodiments, a threshold access density value 251 is any data artefact that, in whole or in part, indicates at least one measure of the newly allocated access density values 231 associated with at least one of the one or more newly allocated data artefacts 221 (e.g., the average of the newly allocated access density values 231 associated with at least one of the one or more newly allocated data artefacts 221, when that average is multiplied by one or more other constant or variable factors). In the embodiment depicted in FIG. 2, the program 110 uses the threshold access density value to determine the prioritized tier organization scheme 160 (e.g., by determining a prioritized tier organization scheme 160 that allocates space on the prioritized storage tier for any optimized data artefact 223 whose associated optimized data access density value 233 exceeds the threshold access density value 251).

Figure 3:
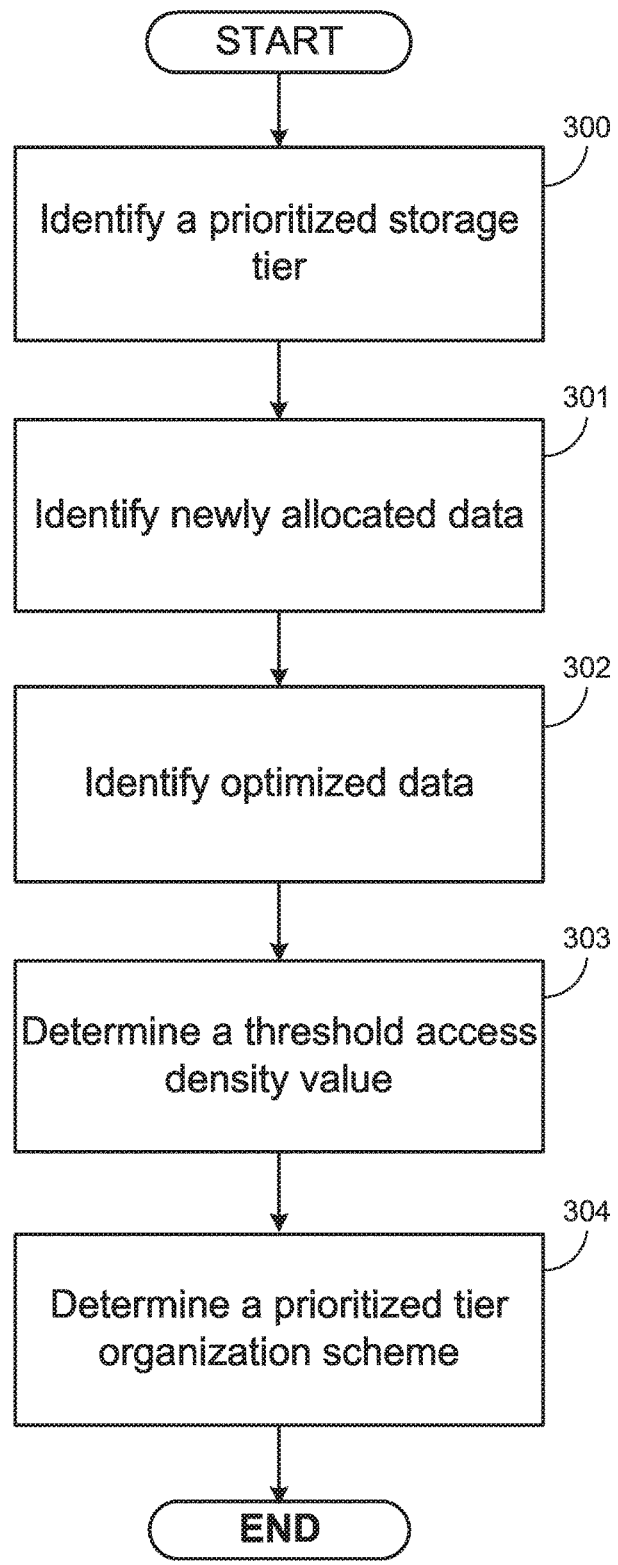
FIG. 3 is an operational example of a storage management program, in accordance with at least one embodiment of the present invention.

FIG. 3 is a flow-chart diagram of a storage management program, in accordance with at least one embodiment of the present invention. At step 300, the program identifies a prioritized storage tier. At step 301, the program identifies one or more newly allocated data artefacts each associated with a newly allocated data access density value. At step 302, the program identifies one or more optimized data artefacts each associated with an optimized data access density value. At step 303, the program determines a threshold access density value based on each newly allocated data access density value. At step 304, the program determines a prioritized tier organization scheme associated with the prioritized storage tier based on the threshold access density value and at least one of each optimized data access density value.

In some embodiments, the storage management program further comprises identifying a computer storage system comprising one or more storage tiers including the prioritized storage tier and one or more secondary storage tiers; determining one or more underprivileged optimized data artefacts; and demoting the one or more underprivileged optimized data artefacts to at least one of the one or more secondary storage tiers. In some embodiments, the computer storage system further comprises one or more communication links between at least two of the one or more storage tiers. In some embodiments, determining the prioritized tier organization scheme comprises determining a recommended amount of space on the prioritized storage tier for allocation to at least one of the following: (i) at least one of the one or more newly allocated data artefacts; and (ii) at least one of the one or more optimized data artefacts. In at least some embodiments, an underprivileged optimized data artefact is an optimized data artefact that is designated and/or determined as eligible for deallocation from the prioritized storage tier and/or demotion to a lower storage tier.

Figure 4:
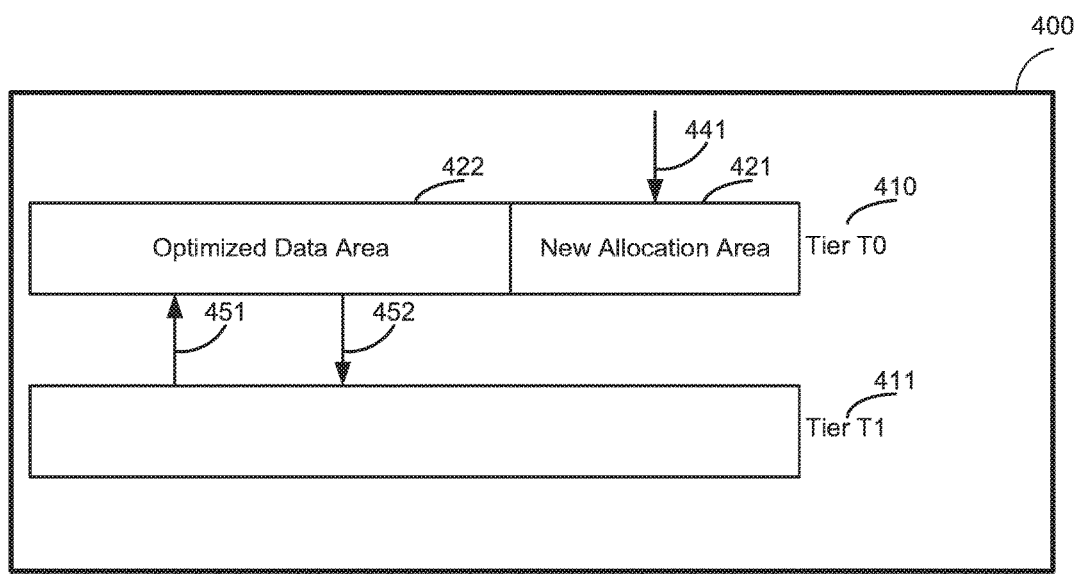
FIG. 4 is an operational example of a computer storage system, in accordance with at least one embodiment of the present invention.

FIG. 4 is an operational example of a computer storage system 400, in accordance with at least one embodiment of the present invention. In the embodiment depicted in FIG. 4, the prioritized storage tier is tier T0 410, which, in accordance with a prioritized tier organization scheme, has been divided into a segment reserved for at least one of the one or more newly allocated data artefacts (i.e., the new allocation area 421) and a segment reserved for at least one of the one or more optimized data artefacts (i.e., the optimized data area 422). In the embodiment depicted in FIG. 4, data flow 441 indicates the storage of at least one of the one or more newly allocated data artefacts in the new allocation area 421 and data flow 451 indicates the promotion of at least one of the one or more optimized data artefacts from tier T1 411 to prioritized storage tier T0 410. Data flow 452 indicates the demotion of at least one of the one or more optimized data artefacts (i.e., the one or more underprivileged optimized data artefacts) from prioritized storage tier T0 410 to storage tier T1 411.

The storage management program identifies the prioritized storage tier at step 300. In some embodiments, the program identifies prioritized storage tier by determining a storage tier as the prioritized storage tier. In some embodiments, the program determines a prioritized storage tier based on one or more configuration data artefacts associated with each of one or more storage tiers in a computer storage system In some embodiments, the program determines a prioritized storage tier based on one or more data artefacts identifying a storage tier as the prioritized storage tier, wherein the program receives those one or more data artefacts from at least one computer (hardware or software) component. In some embodiments, the program determines a prioritized storage tier by randomly selecting a storage tier among one or more storage tiers in a computer storage system. In some embodiments, the program determines the prioritized storage tier based on an identification of the top storage tier in an information lifecycle management (ILM) framework by at least one computer (hardware or software) component, including the computer component comprising the program.

The storage management program identifies the one or more newly allocated data artefacts at step 301. In some embodiments, the program identifies the one or more newly allocated data artefacts based on one or more data artefacts that are allocated and/or stored within a predefined time period (i.e., a learning period) and/or one or more data artefacts that have not been allocated and/or stored at the beginning of the predefined time period. In some embodiments, the program identifies the one or more newly allocated data artefacts based on one or more data artefacts identifying at least one of the one or more newly allocated data artifacts, wherein the one or more data artefacts are received from at least one computer (hardware or software) component. In some embodiments, the program identifies the one or more newly allocated artefacts and/or determines the newly allocated data access density value associated with each of the one or more newly allocated data artefacts based on at least one or more data artefacts indicating, in whole or in part, one property (e.g., the status of allocation, the time of allocation, update and/or retrieval frequency, update and/or retrieval speed, etc.) associated with each of one or more data artefacts. In some embodiments, the program determines the newly allocated data access density value associated with each of the one or more newly allocated data artefacts based on one or more information artefacts received from at least one computer (hardware or software) component, including the computer component comprising the program.

The storage program identifies the one or more optimized data artefacts at step 302. In some embodiments, the program identifies the one or more optimized data artefacts based on one or more data artefacts that have been previously allocated on the prioritized storage tier within a predefined time period (i.e., the decision window) and/or one or more data artefacts that are stored on the prioritized storage tier at a predefined point in time (e.g., at the beginning of the decision window). In some embodiments, the program identifies the one or more optimized data artefacts based on one or more data artefacts that have been designated for promotion and/or have been promoted to a higher storage tier within a predefined time period (i.e., a decision window) and/or one or more data artefacts that have been allocated and/or stored on the prioritized storage tier at the beginning of the predefined time period. In some embodiments, the program identifies the one or more optimized data artefacts based on one or more data artefacts identifying at least one of the one or more optimized data artifacts, wherein the one or more data artefacts are received from at least one computer (hardware or software) component. In some embodiments, the program identifies the one or more optimized artefacts and/or determines the optimized data access density value associated with each of the one or more optimized data artefacts based on at least one or more data artefacts indicating, in whole or in part, one property (e.g., the status of allocation, the time of allocation, update and/or retrieval frequency, update and/or retrieval speed, etc.) associated with each of one or more data artefacts. In some embodiments, the program determines the optimized data access density value associated with each of the one or more optimized data artefacts based on one or more information artefacts received from at least one computer (hardware or software) component, including the computer component comprising the program.

In some embodiments, identifying the one or more optimized data artefacts further comprises: (i) identifying a newly allocated data quantity value associated with the one or more newly allocated data artefacts; (ii) identifying an optimized data quantity value associated with the one or more optimized data artefacts; (iii) determining whether the newly allocated data quantity value exceeds the optimized data quantity value; (iv) responsive to the newly allocated data quantity value exceeding the optimized data quantity value: (a) determining a quantity difference value based on the newly allocated data quantity value and the optimized data quantity value; and (b) determining one or more light optimized data artefacts based on the quantity difference value and each optimized data access density value; and (v) responsive to the newly allocated data quantity value not exceeding the optimized data quantity value, determining the one or more light optimized data artefacts based on the newly allocated data quantity value and each optimized data access density value.

In at least some embodiments, the newly allocated data quantity value associated with the one or more newly allocated data artefacts is a measure of the number (i.e., the quantity) of the one or more newly allocated data artefacts. In at least some embodiments, the optimized data quantity value associated with the one or more optimized data artefacts is a measure of the number (i.e., the quantity) of the one or more optimized data artefacts. In at least some embodiments, the quantity difference value is a measure of the difference between the newly allocated data quantity value and the optimized data quantity value (e.g., the result of the subtraction of the optimized data quantity value from the newly allocated data quantity value). In at least some embodiments, determining one or more light optimized data artefacts based on the quantity difference value and each optimized data access density value comprises determining that, among the one or more optimized data artefacts, a group of them having the lowest optimized data access density value are light optimized data artefacts, wherein the size of that group is a measure of (e.g., is equal to) the quantity difference value. In at least some embodiments, determining the one or more light optimized data artefacts based on the newly allocated data quantity value and each optimized data access density value comprises determining that, among the one or more optimized data artefacts, a group of them having the lowest optimized data access density value are light optimized data artefacts, wherein the size of that group is a measure of (e.g., is equal to) the newly allocated data quantity value. In some embodiments, determining the one or more light optimized data artefacts further comprises sorting the one or more optimized data artefacts based on the optimized data access density value associated with each of the one or more optimized data artefacts (e.g., in an ascending or descending manner).

The storage management program determines a threshold access density value at step 303. In at least some embodiments, the program determines the threshold access density value based on a measure of the access density value associated with each of at least one of the one or more newly allocated data artefacts. In some embodiments, the program determines the threshold access density value based on factors in addition to the measure of the access density values, such as one or more information artefacts about configuration details and/or performance metrics of the computer storage system. In some embodiments, the program determines a threshold access density value based on one or more information artefacts received from at least one computer (hardware or software) component, including the computer component comprising the program. In some embodiments, determining the threshold access density value comprises sorting the one or more newly allocated data artefacts on the newly allocated data access density value associated with each of the one or more newly allocated data artefacts.

In some embodiments, determining the threshold access value further comprises: (i) identifying a predefined segmentation value; (ii) determining one or more dense newly allocated data artefacts based on the predefined segmentation value and each newly allocated data access density value; and (iii) determining a dense data distributional indicator associated with the one or more dense newly allocated data artefacts. In some embodiments, the threshold access value is a measure of (e.g., is equal to) the dense data distributional indicator.

In at least some embodiments, a predefined segmentation value is any value that, in whole or in part, indicates a ratio measure and that is equivalent to a percentage falling in the following range: [0%, 100%] (i.e., the range inclusive of 0%, 100%, and every percentage value falling in between the lower-bound and upper-bound of that range). In at least some embodiments, determining one or more dense newly allocated data artefacts based on the predefined segmentation value and each newly allocated data access density value comprises determining that, among the one or more newly allocated data artefacts, a group of them having the highest newly allocated data access density value are dense newly allocated data artefacts, wherein the size of the group is equal to a ratio of the total number of the one or more newly allocated data artefacts determined by the predefined segmentation value (e.g., the result of the multiplication of the total number of the one or more newly allocated data artefacts by the ratio indicated by the predefined segmentation value). In at least some embodiments, a dense data distributional indicator associated with the one or more dense newly allocated data artefacts is any measure that, in whole or in part, provides at least one piece of information about the statistical distribution of at least one property (e.g., access density) associated with at least one of the one or more dense newly allocated data artefacts, such as a measure derived from the combination of one or more of average, median, mode, and/or estimated moving average of each access density value associated with the one or more dense newly allocated data artefacts.

The storage management program determines a prioritized tier organization scheme at step 304. In at least some embodiments, the program determines the prioritized tier organization scheme based on the threshold access density value. In some embodiments, the program determines prioritized tier organization scheme based on factors in addition to the threshold access density value, such as one or more information artefacts about configuration details and/or performance metrics of the computer storage system. In some embodiments, the program determines a prioritized tier organization scheme based on one or more information artefacts received from at least one computer (hardware or software) component, including the computer component comprising the program. In some embodiments, the program notifies at least one user of the determined prioritized tier organization scheme. In some embodiments, the program stores the prioritized tier organization scheme in at least one computer readable storage media location. In some embodiments, determining a prioritized tier organization scheme comprises allocating a first portion of the prioritized storage tier to the one or more newly allocated data artefacts and a second portion of the prioritized storage tier to the one or more optimized data artefacts whose associated optimized data access density value exceeds the threshold access density value.

In some embodiments, determining the prioritized tier organization scheme further comprises determining one or more underprivileged optimized data artefacts and determining one or more dense newly allocated data artefacts. In some of those embodiments, determining one or more underprivileged optimized data artefacts further comprises determining an optimized data density ratio value based on the threshold access density value and each optimized data access density value. In some of those embodiments, the storage management program determines that an optimized data artefact is an underprivileged optimized data artefact if the optimized data access density value associated with the optimized data artefact is less than the threshold access density value. In some of those embodiments, the storage management program determines that an optimized data artefact is an underprivileged optimized data artefact if the optimized data access density value associated with the optimized data artefact is less than or equal to the threshold access density value. In at least some of those embodiments, the program deallocates the one or more underprivileged data artefacts from the prioritized storage tier and/or demotes the one or more underprivileged data artefacts to a lower storage tier. In at least some embodiments, the optimized data density ratio value is a measure of the ratio of the one or more optimized data artefacts that will be demoted and/or deallocated from the prioritized storage tier. In at least some embodiments, the optimized data density ratio value is a measure of the ratio of the one or more optimized data artefacts that are determined to be underprivileged optimized data artefacts.

In some embodiments, the storage management program identifies a learning period and identifies a decision window. The one or more newly allocated data artefacts are associated with the learning period (e.g., are determined to be newly allocated within the learning period or are determined to be unallocated at the beginning of the learning period). The one or more optimized data artefacts are associated with the decision window (e.g., are determined to be optimized within the decision window or are determined to be optimized data artefacts at the beginning of the decision window). In some embodiments, a newly allocated access density value associated with a newly allocated data artefact is a distributional indicator (e.g., an estimated moving average) of the retrieval and/or update frequency and/or urgency (e.g., the input/output density) associated with the newly allocated data artefact within a predefined time period (e.g., the learning period). In some embodiments, a newly allocated access density value associated with a newly allocated data artefact is a distributional indicator (e.g., an estimated moving average) of the retrieval and/or update frequency and/or urgency (e.g., the input/output density) associated with the newly allocated data artefact within a predefined time period (e.g., the learning period). In some embodiments, the prioritized storage tier comprises two or more computer readable storage media units that are connected in a distributed manner. In some embodiments, the prioritized storage tier and the computer storage system comprising the prioritized storage tier are connected in a distributed manner.

In some embodiments, the storage management program directly manages allocation of storage resources in a storage tier by allocating space for data artefacts in the computer system in which the storage tier operates. In other embodiments, the program makes recommendations to another computer component that manages the allocation of storage resources in a storage tier and cannot directly affect the allocation of those storage resources. In some embodiments, the program is triggered by one or more emergency conditions (e.g., a higher traffic of storage requests exceeding a storage traffic threshold value) to act as a replacement for the computer component that manages the allocation of storage resources in a storage tier during non-emergency conditions.

In general, one or more steps associated with different embodiments of the storage management program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the storage management program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

Aspects of the present invention enable allocating the storage resources provided by a prioritized storage tier to store both newly allocated data and data most in need of optimization to improve performance. The inventors have recognized that allowing a method that integrates the benefits of thin-provisioned hierarchy storage techniques as well as heterogeneous storage techniques with automatic tiering can allow for improving the performance of computer storage systems. In thinly provisioned storage techniques, the prioritized storage tier is used as a default to allocate new data. In heterogeneous techniques that use automatic tiering, the prioritized storage tier is greedily used to improve performance. The inventors have recognized that an approach that is inclusive of the benefits offered by those two techniques can improve the performance of computer storage systems in storing the various types of data they are servicing. Aspects of the present invention enable better utilization of prioritized storage tier to both optimize the performance of computer storage system and improve the storage of newly allocated data. Nevertheless, the aforementioned advantages are not required to be present in all of the embodiments of the invention and may not be present in all of the embodiments of the invention.

Figure 5:
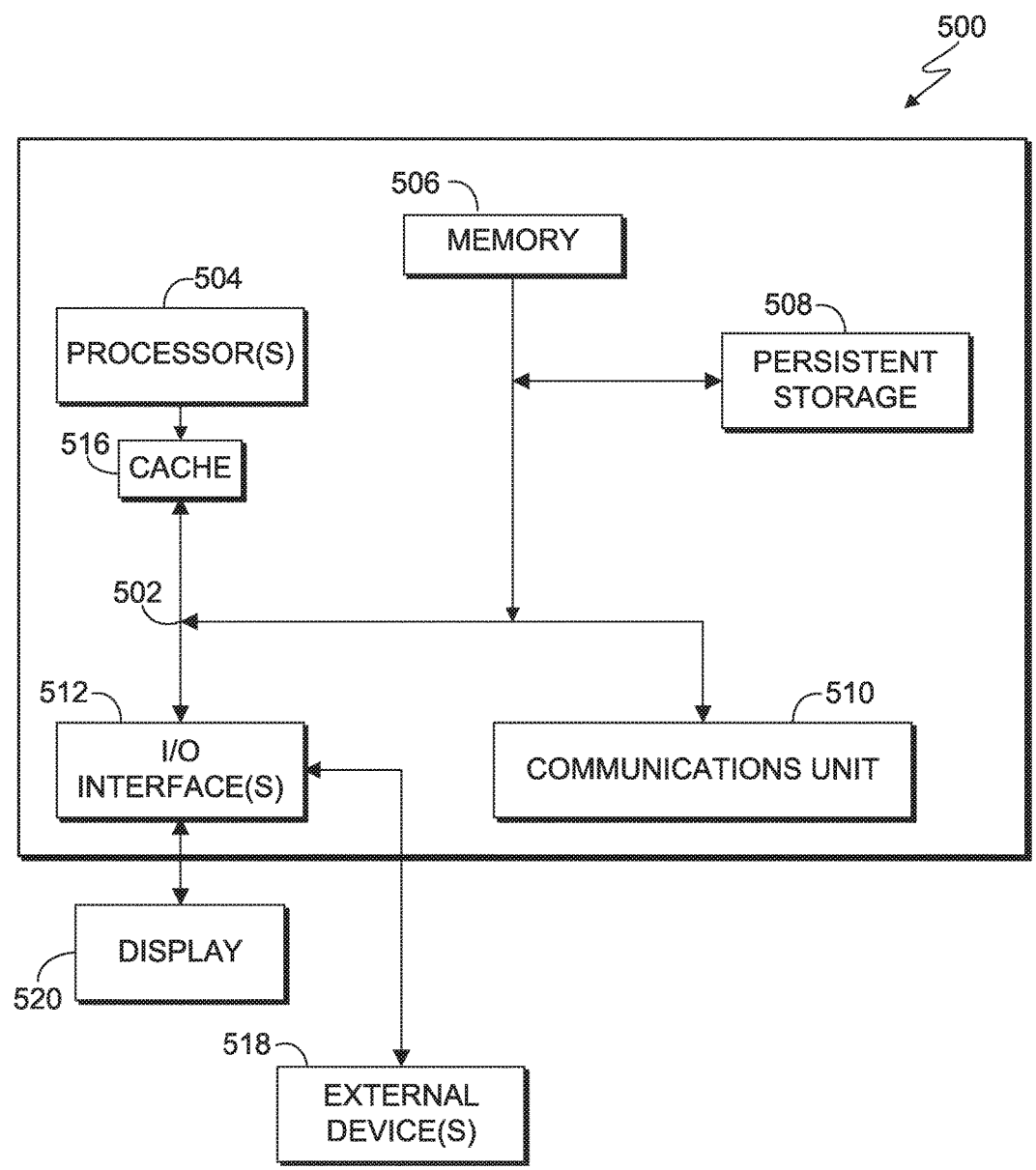
FIG. 5 is a block diagram of a computing apparatus suitable for executing a storage management program, in accordance with at least one embodiment of the present invention.

FIG. 5 is a block diagram depicting components of a computer 500 suitable for executing the storage management program. FIG. 5 displays the computer 500, the one or more processor(s) 504 (including one or more computer processors), the communications fabric 502, the memory 506, the RAM, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the storage management program may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The storage management program may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a prioritized storage tier, a learning period, and a decision window;
   identifying one or more newly allocated data artefacts, said one or more newly allocated data artefacts each being associated with a newly allocated data access density value, wherein said one or more newly allocated data artefacts are associated with said learning period;
   identifying one or more optimized data artefacts, said one or more optimized data artefacts each being associated with an optimized data access density value, wherein said one or more optimized data artefacts are associated with said decision window and identifying said one or more optimized data artefacts further comprises:
      identifying a newly allocated data quantity value, said newly allocated data quantity value being associated with said one or more newly allocated data artefacts;
      identifying an optimized data quantity value, said optimized data quantity value being associated with said one or more optimized data artefacts
      determining whether said newly allocated data quantity value exceeds said optimized data quantity value;
      responsive to said newly allocated data quantity value exceeding said optimized data quantity value:
         determining a quantity difference value based on said newly allocated data quantity value and said optimized data quantity value; and
         determining one or more light optimized data artefacts based on said quantity difference value; and
      responsive to said newly allocated daily quantity value not exceeding said optimized data quantity value, determining said one or more light optimized data artefacts based on said newly allocated data quantity value and each said optimized data access density value;
   determining a threshold access density value based on each said newly allocated data access density value; and
   determining a prioritized tier organization scheme based on said threshold access density value and at least one of each said optimized data access density value, said prioritized tier organization scheme being associated with said prioritized storage tier.

2. The computer-implemented method of claim 1, further comprising:
   identifying a computer storage system, said computer storage system comprising one or more storage tiers including said prioritized storage tier and one or more secondary storage tiers;
   determining one or more underprivileged optimized data artefacts; and
   demoting said one or more underprivileged optimized data artefacts to at least one of said one or more secondary storage tiers.

3. A computer program product, the computer program product comprising one or more computer readable storage media and program instructions stored on said one or more computer readable storage media, said program instructions comprising instructions to:
   identify a prioritized storage tier, a learning period, and a decision window;
   identify one or more newly allocated data artefacts, said one or more newly allocated data artefacts each being associated with a newly allocated data access density value, wherein said one or more newly allocated data artefacts are associated with said learning period;
   identify one or more optimized data artefacts, said one or more optimized data artefacts each being associated with an optimized data access density value, wherein said one or more optimized data artefacts are associated with said decision window and program instructions to identify said one or more optimized data artefacts further comprise program instructions to:
      identify a newly allocated data quantity value, said newly allocated data quantity value being associated with said one or more newly allocated data artefacts;
      identify an optimized data quantity value, said optimized data quantity value being associated with said one or more optimized data artefacts
      determine whether said newly allocated data quantity value exceeds said optimized data quantity value;
      responsive to said newly allocated data quantity value exceeding said optimized data quantity value:
         determine a quantity difference value based on said newly allocated data quantity value and said optimized data quantity value; and
         determine one or more light optimized data artefacts based on said quantity difference value; and
      responsive to said newly allocated daily quantity value not exceeding said optimized data quantity value, determine said one or more light optimized data artefacts based on said newly allocated data quantity value and each said optimized data access density value;
   determine a threshold access density value based on each said newly allocated data access density value; and
   determine a prioritized tier organization scheme based on said threshold access density value and at least one of each said optimized data access density value, said prioritized tier organization scheme being associated with said prioritized storage tier.

4. The computer program product of claim 3, wherein said program instructions further comprise instructions to:

identify a computer storage system, said computer storage system comprising one or more storage tiers including said prioritized storage tier and one or more secondary storage tiers;
determine one or more underprivileged optimized data artefacts; and
demote said one or more underprivileged optimized data artefacts to at least one of said one or more secondary storage tiers.

5. A computer system comprising:
a processor;
one or more computer readable storage media;
computer program instructions;
said computer program instructions being stored on said one or more computer readable storage media; and
said computer program instructions comprising instructions to:
identify a prioritized storage tier, a learning period, and a decision window;
identify one or more newly allocated data artefacts, said one or more newly allocated data artefacts each being associated with a newly allocated data access density value, wherein said one or more newly allocated data artefacts are associated with said learning period;
identify one or more optimized data artefacts, said one or more optimized data artefacts each being associated with an optimized data access density value wherein said one or more optimized data artefacts are associated with said decision window and program instructions to identify said one or more optimized data artefacts further comprise program instructions to:
identify a newly allocated data quantity value, said newly allocated data quantity value being associated with said one or more newly allocated data artefacts;
identify an optimized data quantity value, said optimized data quantity value being associated with said one or more optimized data artefacts
determine whether said newly allocated data quantity value exceeds said optimized data quantity value;
responsive to said newly allocated data quantity value exceeding said optimized data quantity value:
determine a quantity difference value based on said newly allocated data quantity value and said optimized data quantity value; and
determine one or more light optimized data artefacts based on said quantity difference value; and
responsive to said newly allocated daily quantity value not exceeding said optimized data quantity value, determine said one or more light optimized data artefacts based on said newly allocated data quantity value and each said optimized data access density value;
determine a threshold access density value based on each said newly allocated data access density value; and
determine a prioritized tier organization scheme based on said threshold access density value and at least one of each said optimized data access density value, said prioritized tier organization scheme being associated with said prioritized storage tier.

* * * * *